United States Patent [19]

Couturier

[11] Patent Number: 4,483,412

[45] Date of Patent: Nov. 20, 1984

[54] NOISE ABSORPTION APPARATUS

[75] Inventor: Jean-Maurice Couturier, Orleans, France

[73] Assignee: Deere & Company, Moline, Ill.

[21] Appl. No.: 439,087

[22] Filed: Nov. 4, 1982

[30] Foreign Application Priority Data

Nov. 4, 1981 [EP]  European Pat. Off. ........ 81401766.1

[51] Int. Cl.³ .............................................. F01N 1/10
[52] U.S. Cl. ................................... 181/204; 181/225; 181/256; 181/268; 181/269; 180/69.2
[58] Field of Search ............... 181/200, 204, 224, 225, 181/256, 268, 269; 123/198 E; 180/69.2

[56] References Cited

U.S. PATENT DOCUMENTS

| | | | |
|---|---|---|---|
| 3,762,489 | 10/1973 | Proksch et al. | 181/204 X |
| 4,260,037 | 4/1981 | Eline | 181/225 X |
| 4,289,096 | 9/1981 | Latham et al. | 123/198 E |

FOREIGN PATENT DOCUMENTS

| | | |
|---|---|---|
| 334697 | 1/1977 | Austria. |
| 2526638 | 12/1976 | Fed. Rep. of Germany. |
| 2454750 | 3/1982 | Fed. Rep. of Germany. |
| 2240858 | 3/1975 | France. |
| 2248723 | 5/1975 | France. |
| 2479324 | 10/1981 | France. |

Primary Examiner—Benjamin R. Fuller

[57] ABSTRACT

Sound damping apparatus for internal combustion engines, especially for public works or agricultural machines, and machines provided with such an apparatus. This sound damping device is intended for machines or engines mounted within a bonnet (1) and provided with a blower (3) discharging cooling air to the outside through a radiator (4). It is constituted by a sound damping element (9, 21) such as a block of expanded foam material having one or more central openings (14) oriented in the direction of flow of the air discharged by the blower and peripheral openings (16) inclined or specially shaped so as to direct the air towards the central flow passing through the central opening or openings downstream of the device. Means are provided for forming an expansion chamber (13) between the radiator and the sound damping element. There is produced as a result of this inclination a jet effect exerted by the lateral air on the central flow which produces the aspiration of a fraction of the said lateral air towards the center in the expansion chamber and a reduction of the noise level.

17 Claims, 6 Drawing Figures

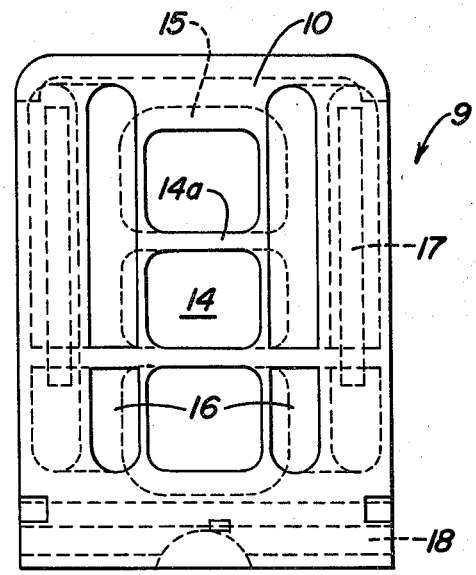
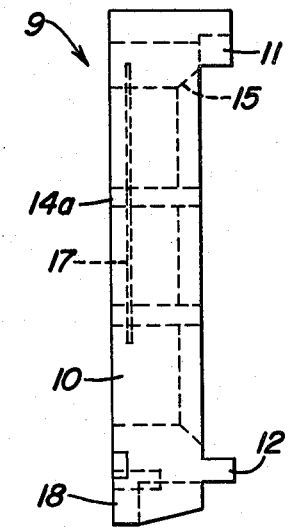
FIG. 3  FIG. 4
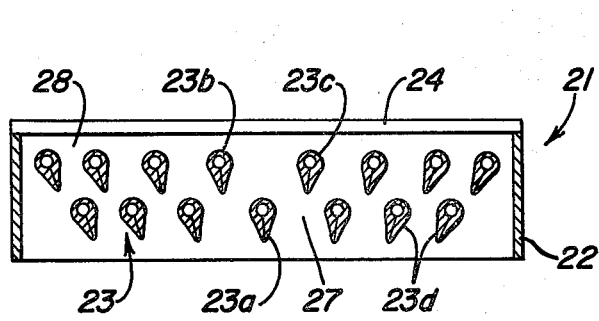
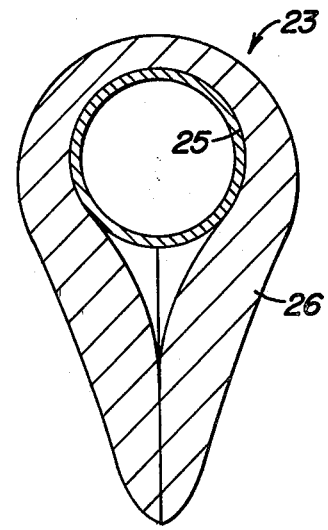
FIG. 5  FIG. 6

NOISE ABSORPTION APPARATUS

BACKGROUND OF THE INVENTION

The present invention is concerned with the sound damping of noise-producing engines such as internal combustion engines that are housed in a bonnet substantially completely enclosing the engine and the cooling of which is provided by a fan associated with a radiator. It is applicable particularly to public works or agricultural machines of the type in which an engine, usually a diesel engine, is housed in a bonnet which encloses it substantially completely and which has inlet and outlet orifices or openings for the cooling air. It is applicable more particularly to power units or machines provided with a blowing fan which discharges cooling air from the engine to the outside of the bonnet through a radiator traversed in the conventional way by the cooling liquid.

It is known that machines such as public works machines are the source of very high noise levels, and the regulations in force in most countries limit the noise level which is permissible for such machines which often have to operate not far from residential localities. Consequently, numerous solutions have already been proposed for reducing this noise level by the interposition between the source of the noise and the outside environment and absorbing screens provided with openings for the passage of air for cooling the power unit.

In the prior technology, it has thus been proposed (French Pat. No. 73-37 336) to mount, in the outlet path of air discharged by a blower through a radiator fitted to an engine of a public works machine, a sound damping assembly having non-rectilinear passages delimited by strips coated with foam material which ensures the absorption of noise, the non-rectilinear shape of these strips preventing direct outflow of the air and hence a likewise direct radiation of the sound waves. But such a solution, even if it has certain advantages, involves a relatively complex and expensive constructional arrangement and it is combersome, which may necessitate a lengthening of the frame of the machine in order to support the sound damping assembly.

It has moreover been proposed in to mount, in German Patent Application No. 25 54 750 the outflow path of the air discharge by a blower through a radiator, noise-reducing dampers protected by a perforated metal sheet. But in this case also, the cumbersomeness of the sound damping system is relatively great and the arrangement as a whole is a rather complex construction.

It has also been proposed, for the sound damping of public works or agricultural machines (French Pat. No. 81-05 510) to interpose, in the outflow path of the air discharged by the blower, a block of cellular material or foam material provided with parallel channels for the passage of air having dimensions included within certain limits. The bulkiness of such an acoustic damping arrangement is therefore distinctly more reduced and the carrying out of the arrangement is simple.

SUMMARY OF THE INVENTION

An object of the invention is to provide improvements in the sound damping or sound deadening devices of this general type while making it possible to produce a less bulky device which provides a very efficient acoustic damping.

Another object of the invention is to provide a sound damping device which, reduced bulkiness of the device, can be fitted to a public works or agricultural machine, such as a mechanical loader or a tractor for example, without modifying the chassis frame or the outer sides of the machine.

Yet another object is to provide a sound damping device having an extremely simple design and construction and consequently having a restricted manufacturing cost, while at the same time affording efficient sound damping.

The invention is consequently concerned with a sound damping device for machines provided with internal combustion engines mounted within a bonnet which substantially completely encloses the machine engine. A blower discharges cooling air outwardly through a radiator which discharged air is received by the invention constituted by a damping element made of a sound absorbing material and having one or more central openings oriented substantially in the direction of the blower discharge air so as to permit a direct outflow of air. Peripheral openings are provided inclined or specially shaped with respect to the direction of the central openings discharge air in such a manner that the air passing through the peripheral openings is directed obliquely to the central flow of air issuing from the central opening or openings of the element. Means are provided to maintain the sound damping element spaced from the radiator so as to form between them an expansion chamber for the air discharged by the blower through the radiator.

The element advantageously has several central openings separated by parallel deflectors, the spacing between the said deflectors being calculated with a view to the absorption of the most objectionable frequencies, so that there is thus obtained by conventional means a supplementary reduction of the noise level.

The desired result can be obtained by providing in the sound damping element rectilinear peripheral openings which are inclined with respect to the direction of the flow of air discharged by the blower or specially shaped openings. But in all cases, the cross-section and/or the shape of the openings in the said sound damping element are designed in such a way as to avoid the turbulence in the flow of air which would obviously be the source of an increase in the noise level.

According to an embodiment which appears to be advantageous, the sound damping element is constituted by a block of cellular or expanded foam material having suitable openings. For this purpose, use may be made, for example, of a block of expanded polyurethane with open cells covered by a fluid-tight film which may also be composed of polyurethane. An element of this kind provides a very good noise absorption and consequently a very good damping effect. The necessary openings can then be formed in the said block directly during the production thereof by moulding, in a conventional manner. The dimensions of the openings and the angles of inclination of the peripheral openings depend on parameters such as the size of the blower, that of the radiator, the relative dimensions of the blower and radiator in relation to the engine bonnet. The dimensions and angles of inclination can easily be determined empirically so as to obtain the optimum degree of sound damping.

A sound damping block of this kind can provide a very good sound damping for a relatively small thickness, of the order of 100 to 200 mm for example, so that it can be fitted behind the radiator of a public works machine or of a tractor without modifying the chassis frame and without any increase in bulk. It is covered in the conventional manner on its outer surface by a grille or the like which interferes as little as possible with the outflow of the air.

Preferably, the sound damping block of expanded foam material has external dimensions such that it may be fitted in the bonnet of the power unit with a slight amount of deformation, which provides a good imperviousness to noise over the entire outer surface of the sound damping block between the latter and the bonnet without it being necessary to call upon supplementary means. Moreover, one or more reinforcement struts, for example of metal or other rigid material, can be encased in the sound damping block.

Advantageously, the means that maintain the sound damping element spaced from the radiator may be constituted by one or more flanges moulded integrally with the sound damping block and abutting against the radiator in the assembled position so as to form the required expansion chamber.

The maintenance of the sound damping block in position may be obtained in any desired manner, but a simple solution consists in providing towards the rear end of the bonnet lugs or the like behind which the block is engaged by elastic deformation.

Advantageously, in the case of a machine such as a public works machine or a tractor having a hydraulic pump or like device mounted in the lower rear part thereof, the sound damping block is extended downwardly so as to cover this hydraulic pump and thus likewise to ensure the sound damping thereof.

According to a variant, the sound damping element has a frame in which are mounted strips forming deflectors which are oriented for example vertically, the distribution of these strips being such that they form between them one or more central passages oriented substantially in the direction of discharge of the air by the blower and peripheral or lateral passages inclined with respect to this discharge direction towards the center of the sound damping element so as to produce in this case also an aspirating and accelerating effect on the air passing through the central passage or passages.

These strips advantageously have an aerodynamic section, for example that of a "drop of water" so as to disturb the flow of air as little as possible and to avoid turbulances. They are advantageously constituted by a central support such as a tube surrounded by a cellular or expanded foam material so as to avoid any reflection of sound waves.

Preferably, the strips, at least in the lateral parts of the frame, are disposed in staggered relationship across the path of flow of the air and their cross-section and their distribution are such that they stand in the way of any rectilinear flow of streams of air at right angles to the said strips, so as to shut off any "direct vue" of the sound in this zone.

The strips are, as indicated, fixed by their ends in a mounting frame which is itself preferably coated with a cellular material that prevents the reflection of sound waves. The means that maintain the sound damping element spaced from the radiator may be provided directly on the frame which supports the strips.

The invention is also concerned with stationary or mobile machines and especially public works or agricultural machines provided with a sound proofing device such as that specified above.

The description which will follow, made with reference to the annexed drawings, given non-limitatively, will enable the invention to be better understood.

BRIEF DESCRIPTION OF THE DRAWINGS

FIG. 3 is a front view of the sound damping block provided according to FIGS. 1 and 2.

FIG. 4 is a corresponding side view.

FIG. 5 is a view in horizontal section of a variant construction comprising a frame and strips forming deflectors.

FIG. 6 is a view in transverse section on a larger scale of one of the strips used according to the embodiment shown in FIG. 5.

DESCRIPTION OF THE PREFERRED EMBODIMENT

Taking into account its most widespread application, the invention will be described below in its use on public works or agricultural machines such as mechanical loaders, tractors etc..., but it will be understood that it is also applicable to stationary machines or power units of the above-mentioned general type, in which a power plant housed in a bonnet is cooled by a radiator-fan assembly, and more particularly by a radiator-blower assembly.

It is known that the flow of air from a blower is not uniform over the whole flow area of air discharged by the blower. There is in the center of the blower a zone in which the rate of flow is distinctly weaker, the said flow increasing towards the outside so as to assume a maximum value in a peripheral zone. Now, the noise level obtained for a machine or engine of the type concerned is a function of the rate of flow of the discharged air.

The investigations that have led to the invention have shown that it is possible to reduce the sound level effectively by directing towards the outside the air discharged by the blower in the central part of the latter and deflecting the air from the peripheral zone in the direction of the central flow of air. There is then produced in effect, under the action of the peripheral air flowing in a stream at a high speed as a result of its delivery rate, an acceleration by aspiration of the central flow, due to the jet effect, which thus tends to produce downstream of the sound damping element, in the above-mentioned expansion chamber, an aspiration effect on the peripheral air a part of which will thus be directed towards the center of the element and will be evacuated through its central opening or openings, with, as a result, a redistribution of the air in the flow area of the sound damping element.

Preferably the central opening or openings in the element has or have a substantial flow area.

Figure 1:
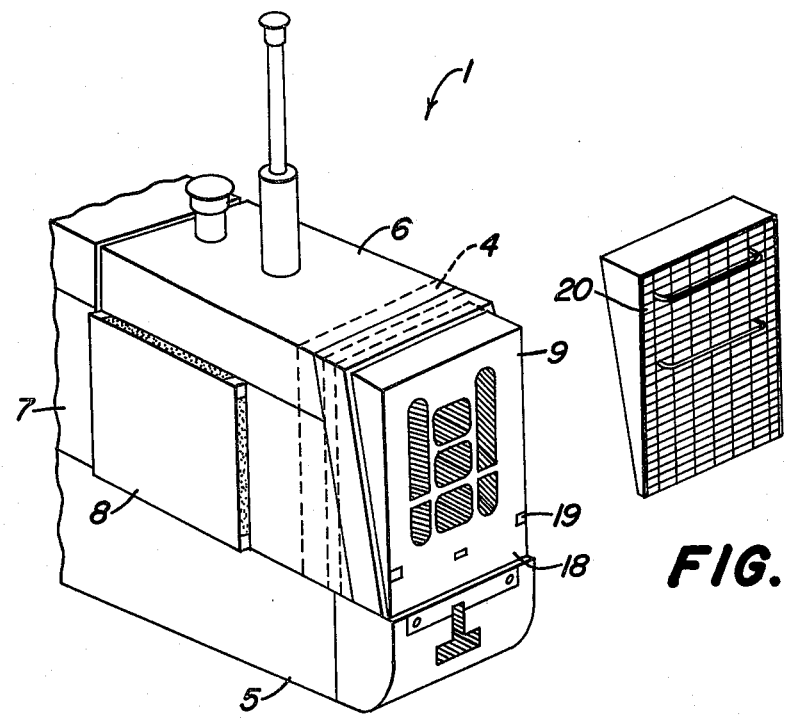
FIG. 1 is a schematic perspective view of the rear part of a public works machine showing the sound damping device provided according to one embodiment of the invention.
Figure 2:
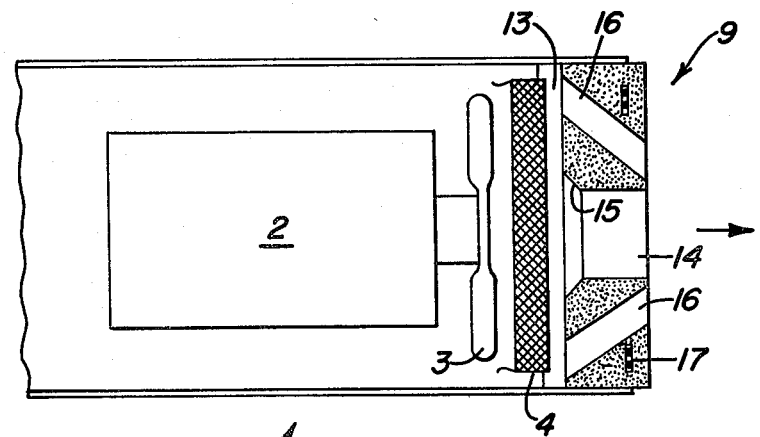
FIG. 2 is a view in schematic horizontal section corresponding to FIG. 1.

There has been shown schematically in FIGS. 1 and 2 the rear part of a public works machine and more particularly the part comprising the power unit which includes a bonnet indicated generally by the reference 1 within which is mounted a diesel-type engine 2 (FIG. 2) combined with a blower 3. A radiator 4 is mounted in the usual manner behind the blower 3.

The bonnet 1 completely surrounds the power unit 2 which is supported by the chassis frame 5 of the machine. The bonnet 1 has an upper part 6 and lateral parts 7 in which are provided air inlet panels 8 which may be of any suitable construction, but preferably one which avoids aspiration noises, for example panes provided with apertures and coated internally with a coating of cellular material.

There is provided behind the radiator 3, in a conventional manner, a sound damping device which prevents an unacceptable noise level behind the machine.

According to the embodiment of the invention being considered, this sound damping device comprises a sound damping block of cellular material, indicated as a whole by the reference 9. The construction of this block of cellular material can be better seen in FIGS. 3 and 4.

It is constituted by an expanded foam with open cells, such as an expanded polyurethane foam, covered on the outside thereof by a fluid-tight film which may also be of polyurethane. The sound damping block has a body 10 which includes an upper flange 11 and a lower flange 12 extending over the whole of its width and designed to bear, in the assembled condition, against the upper and lower parts of the radiator 4, so as to form between the latter and the sound damping block an expansion chamber which is shown at 13 in FIG. 2.

The sound damping block 9 comprises in the present case, three central openings 14 which are vertically superposed and the axis of which is oriented in the direction of discharge of the air by the blower 3, that is to say the longitudinal direction of the machine provided with the sound damping device according to the invention. It can be seen particularly from the drawings that the openings 14 are of a large section and that the forwardly extending edges thereof are chamfered so as to enable the air to penetrate into the openings 14 without turbulent flow, which avoids the production of additional noise.

There are also provided, on each side of the central superposed openings 14, lateral openings 16 which extend substantially the entire height of the body 10 of the sound damping block. According to the embodiment considered, each lateral opening 16 is interrupted at 17 (FIG. 3) in order to give the block 9 a better shape. These lateral openings 16 would likewise be subdivided into a certain number of elementary openings.

As is clear from FIG. 2 and FIG. 3, the lateral openings 16 are inclined in the direction towards the center of the sound damping block 9 from the periphery of the said block. The purpose of this inclination will be indicated later.

There are shown at 17 in FIGS. 2, 3 and 4 reinforcement struts which are provided in the sound insulating block in order to prevent the deformation thereof. These reinforcement struts 17, at which may be of metal or another rigid material, are embedded in the block during the moulding thereof, that is to say preferably by making an incision in the block off expanded foam material after it has been formed, introducing the reinforcements into their positions and sticking the two parts of the expanded foam material together again outside the reinforcements, so as to avoid any presence of rigid material that could reflect sound waves on the outside of the sound damping block.

As can also be seen in the drawings, the block 9 is extended downwardly at 18 below the flange 12 so as to cover the hydraulic pump of the machine with a view to sound damping it.

The sound damping block 9 has external dimensions such that it can be inserted with a small amount of deformation in the bonnet 1 of the engine at the rear portion thereof, thus ensuring, without having to call upon other means, a satisfactory fluid tightness all around the bonnet and preventing the passage of sound waves that produce additional noise.

The keeping in place of the sound damping block is advantageously ensured by means of lugs 19 (FIG. 1) provided on the rear edge of the bonnet of the engine and directed inwardly, the block 9 of cellular material being capable of being easily inserted behind the said retaining lugs 19 by mere elastic deformation. The protection of the block 9 is ensured by a grille 20 which may be of any desired type and which is fixed in a conventional manner on the rear end of bonnet 1 of the power unit of the machine.

The sound damping block operates in the following manner: It is known that the flow of air passing through the radiator 4 in the region of central part of a blower such as the fan 3 is weak. By contrast, this flow increases in the direction towards the periphery of the blower up to a maximum flow in a peripheral zone of the latter.

Due to the arrangement provided according to the invention, the air which is discharged by the blower 3 in the peripheral part thereof passes through the lateral openings 16 of the sound damping block 9 and is directed by the lateral openings towards the center of the block and of the machine. At the outlet of the inclined lateral openings 16, the air flows produces on the air that escapes through the central openings 14 a jet effect which causes an aspiration and an acceleration. This aspiration effect is transmitted as far as the front part of the sound damping block 9, into the expansion chamber 13, and it acts on the flow of air which is present at the periphery of the said expansion chamber and which tends to penetrate through the lateral openings 16. There is obtained as a result the aspiration of a fraction of this lateral air towards the central openings 14 and a redistribution of the air tending towards an equilibrium throughout the whole outflow area of the sound damping block, which, as the investigations that have been carried out have shown, makes possible a distinct reduction in the noise level behind the machine.

Tests have shown that the noise level can thus be brought down to a value that is acceptable according to the regulations in force by means of a block 9 of cellular material having a thickness of the order of 150 mm and with an inclination of the lateral openings 16 with respect to the axis of the blower 3 of from 25° to 40°, which inclination provides the jet and aspiration effect mentioned above.

Reference will now be made to FIGS. 5 and 6 which show a constructional variant of the invention.

In this case, the sound damping device, indicated as a whole by the reference 21, comprises frame 22 which is made of a rigid material, preferably coated with a cellular material, within which are mounted vertical strips 23. The said frame 22 has towards its upper part and towards its lower part, flanges 24 directed forwardly in the mounting position and designed to bear against the radiator in order to maintain the said frame spaced from the said radiator and thus to produce an expansion chamber similar to the expansion chamber 13 shown in FIG. 2.

In FIG. 6 there has been shown a constructional form of strip 23 which can be used in the present case. This strip comprises a tube 25 of rigid material, for example of metal, which is surrounded by expanded foam material having in cross-section an aerodynamic shape corresponding to that of a drop of water, so as to facilitate the flow and to avoid turbulance.

In FIG. 5 is shown the distribution of the strips in the frame 22, which corresponds to an important characteristic of the invention. In this case, it will be seen that there are provided towards the central part strips 23a, 23b, 23c which are disposed in such a manner that their plane of symmetry, indicated at Y in FIG. 6, is oriented in the direction of discharge of the air by the blower. The strips 23a, 23b, 23c also form air passages 27 which are likewise oriented in the direction of the discharge of the air by the blower, so as to permit a flow of air in the longitudinal direction of the machine.

On each side of the said strips 23a, 23b, 23c, there are provided other strips, indicated generally at 23d, which are oriented obliquely with respect to the longitudinal axis of the device 21 in such a way that their rear points are oriented towards the center of the said device. As a result, there is obtained an oblique orientation of the streams of air with respect to this longitudinal direction in the lateral parts of the device 21, as indicated for the passages 28, the streams of air meeting the central flow of air and exercising on it an aspiration and jet effect as in the previous embodiment.

Preferably, the distribution of the strips and their cross-section are designed to avoid any rectilinear outflow of streams of air in the lateral parts of the device 21, which also prevents any "direct vue" of the noise for a person located behind the machine provided with the said sound damping device.

I claim:

1. Sound damping device for machines or internal combustion engines mounted within a bonnet which substantially completely encloses the machine or the engine and provided with a blower which discharges cooling air outwardly through a radiator, comprising: damping element (9, 21) made of a sound absorbing material and having one or more central openings (14, 27) oriented substantially in the direction of discharge of the air by the blower (3) so as to permit a direct outflow of air and having peripheral openings (16, 28) which are inclined or specially shaped with respect to the said direction of discharge of the air in such a manner that the air passing through these openings is directed obliquely to the central flow of air issuing from the central opening or openings of the element, in combination with means (11, 12, 24) for maintaining the said sound damping element spaced from the radiator (4) so as to form between them an expansion chamber (13) for the air discharged by the blower through the said radiator.

2. Sound damping device as claimed in claim 1, wherein said central opening (14, 27) of the sound damping element include a substantial flow area.

3. Sound damping device as claimed in claim 1 further comprises a plurality of central openings (14) separated from each other by parallel deflectors (14a), said deflector being spaced apart to provide substantial absorption of the most objectionable frequencies in order to produce a supplementary reduction of the noise level.

4. Sound damping device as claimed in claim 1, wherein said sound damping element is comprised of a block (9) of cellular or expanded foam material.

5. Sound damping device as claimed in claim 4 wherein said block is comprised of a thickness of between 100 and 200 mm.

6. Sound damping device as claimed in claim wherein said block (9) of cellular material further comprises external dimensions such that it fits in the bonnet enclosing the machine or engine with a slight amount of deformation, so as to ensure an imperviousness to noise with respect to the said bonnet.

7. Sound damping device as claimed in claim 4 wherein said block (9) further comprises at least one reinforcement strut (17) of rigid material, especially of metal, which are completely enveloped by the cellular material.

8. Sound damping device as claimed in claim 6 wherein said bonnet (1) includes retaining lugs (19), and said sound damping block (9) being engaged by rearward deformation of the said lugs for the fixing thereof.

9. Sound damping device as claimed in claims 4, 5, 6, 7 or 8 wherein said means that maintain the sound damping element (9) spaced from the radiator (4) includes at least one flange (11, 12) moulded integrally with the sound damping block.

10. Sound damping device as claimed in claim 4, applicable to a machine having a hydraulic pump or a like device located in the lower rear part thereof, wherein said sound damping block (9) further comprises a portion downwardly extending so as to cover the said hydraulic pump and to ensure the sound damping thereof.

11. Sound damping device as claimed in claim 2, further comprises a frame (22) having mounted strips (23) forming deflectors having a generally vertical orientation, the distribution of said strips being such that they form between them one or more central passages (27) oriented substantially in the direction of discharge of the air by the blower, and peripheral or lateral passages (28) inclined with respect to this discharge direction towards the center of the sound damping element (21).

12. Sound damping element as claimed in claim 11, wherein said strips are comprised of an aerodynamic section, generally of water drop shape.

13. Sound damping element as claimed in claim 12, wherein said strips (23) are further comprised of a rigid support (25) such as a tube surrounded by cellular material (26).

14. Sound damping element according to claim 12 or 13 wherein said strips (23) are, at least in the lateral parts of the frame, disposed in staggered relationship to the path of flow of the air, their cross-section and their spacing being such that they are opposed to any rectilinear flow of streams of air across the said strips.

15. Sound damping element as claimed in claims 12 or 13, wherein said strips (23) are fixed by their ends in said frame (22) being coated with cellular material and provided with means (24) which maintain them spaced from the radiator so as to provide an air expansion chamber.

16. Sound damping device according to claim 9, applicable to a machine having a hydraulic pump or a like device located in the lower rear part thereof, characterised in that the sound damping block (9) is extended downwardly so as to cover the said hydraulic pump and to ensure the sound damping thereof.

17. Sound damping element according to claim 14, characterised in that the strips (23) are fixed by their ends in said frame (22) being coated with cellular material and provided with means (24) which maintain them spaced from the radiator so as to provide an air expansion chamber.

* * * * *

UNITED STATES PATENT AND TRADEMARK OFFICE
CERTIFICATE OF CORRECTION

PATENT NO. : 4,483,412
DATED : 20 November 1984
INVENTOR(S) : Jean-Maurice Couturier It is certified that error appears in the above-identified patent and that said Letters Patent is hereby corrected as shown below:

In column 8, line 4, after claim, add -- 5 -- .
In column 8, line 51, after "claims" insert -- 11,--.

Signed and Sealed this

Eighth Day of October 1985

[SEAL]

Attest:

Attesting Officer

DONALD J. QUIGG

Commissioner of Patents and
Trademarks—Designate